(12) United States Patent
Miyakawa

(10) Patent No.: US 10,185,457 B2
(45) Date of Patent: Jan. 22, 2019

(54) INFORMATION PROCESSING APPARATUS AND A METHOD FOR CONTROLLING THE INFORMATION PROCESSING APPARATUS

(71) Applicant: CANON KABUSHIKI KAISHA, Tokyo (JP)

(72) Inventor: Takumi Miyakawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 332 days.

(21) Appl. No.: 14/541,634

(22) Filed: Nov. 14, 2014

(65) Prior Publication Data

US 2015/0160789 A1 Jun. 11, 2015

(30) Foreign Application Priority Data

Dec. 6, 2013 (JP) .................................. 2013-253173

(51) Int. Cl.
*G06F 3/0481* (2013.01)
*G06F 3/0484* (2013.01)
(Continued)

(52) U.S. Cl.
CPC .......... *G06F 3/0481* (2013.01); *G06F 1/1626* (2013.01); *G06F 3/0488* (2013.01); *G06F 3/04842* (2013.01); *G06F 9/543* (2013.01)

(58) Field of Classification Search
CPC ................. G06F 1/1626; G06F 4/0482; G06F 3/04842–3/04847; G06F 3/048–3/04897;
(Continued)

(56) References Cited

U.S. PATENT DOCUMENTS

2010/0056220 A1* 3/2010 Oh ........................ G06F 1/1616
455/566
2012/0231884 A1 9/2012 Sakai
(Continued)

FOREIGN PATENT DOCUMENTS

WO 2013/151400 A1 10/2013

OTHER PUBLICATIONS

Office Action dated Sep. 19, 2017, in JP application 2013-253173 (3 pages including partial English translation).

*Primary Examiner* — Namitha Pillai
*Assistant Examiner* — Liang Li
(74) *Attorney, Agent, or Firm* — Venable LLC

(57) ABSTRACT

An information processing apparatus comprises a display, comprising: a display control unit configured to display a first window and a second window on the display with the second window positioned behind the first window and at least partially overlapped with the first window; a first obtaining unit configured to obtain a first position information representing a position within a display range of the display designated on the display. The information processing apparatus further comprises a second obtaining unit configured to obtain a second position information corresponding to position information representing a position within the display range of the display, the second position information designated in an area corresponding to a rear side of the display and existing on one surface among the surfaces constituting the information processing apparatus.

8 Claims, 13 Drawing Sheets

(51) Int. Cl.
*G06F 3/0488* (2013.01)
*G06F 1/16* (2006.01)
*G06F 9/54* (2006.01)

(58) Field of Classification Search
CPC ........ G06F 2203/04808; G06F 1/169–1/1692; G06F 3/0487–3/04886
See application file for complete search history.

(56) References Cited

U.S. PATENT DOCUMENTS

| | | | |
|---|---|---|---|
| 2014/0035942 A1* | 2/2014 | Yun | G09G 5/006 345/592 |
| 2014/0139443 A1* | 5/2014 | Kao | G06F 3/041 345/173 |
| 2014/0237404 A1* | 8/2014 | Kim | G06F 3/04883 715/765 |
| 2014/0317572 A1* | 10/2014 | Park | G06F 3/04817 715/835 |
| 2016/0034132 A1* | 2/2016 | Huang | G06F 3/017 345/173 |
| 2017/0131881 A1* | 5/2017 | Miyazaki | G06F 3/04842 |

\* cited by examiner

INFORMATION PROCESSING APPARATUS AND A METHOD FOR CONTROLLING THE INFORMATION PROCESSING APPARATUS

BACKGROUND OF THE INVENTION

Field of the Invention

The present invention relates to an information processing apparatus comprising a position input device such as touch pads and the like provided at an interface.

Description of the Related Art

An information processing apparatus such as smart phones, tablet terminals and the like comprises a touch panel, in which a display and a touch pad are combined, as user interface. In these information processing apparatus, display item is sometimes operated by the touch panel. The operation includes the operation of copying URL (Uniform Resource Locator) described in an e-mail to a clipboard and pasting the copied URL to a browser. Also, the operation includes the operation of copying an imaged image to the clipboard and pasting the copied imaged image to an image processing application.

The item is copied and pasted by a user's touch operation to the item displayed on a display. After the item is copied to the clipboard, it is pasted at a desired position. It is difficult to intuitively determine whether copying the item to the clipboard is succeeded or not. Further, the user cannot select the item to be pasted from the clipboard through an intuitive operation.

United States Patent Application Publication No. US2012/0231884 discloses a game apparatus which is operable by a rear touch panel provided on the other side of a surface on which display device is mounted. The game apparatus displays a sub screen for providing function associated with an operation of the rear touch panel in addition to a basic screen provided by a running game program. According to the United States Patent Application Publication No. US2012/0231884, data stored in a clipboard is displayed on the sub screen while sorting the data by tabs. If the user drags and drops the data displayed on the basic screen, the dropped data is added to the clipboard.

According to the United States Patent Application Publication No. US2012/0231884, the clipboard (sub screen) is displayed on the display by operating the rear touch panel so that the basic screen and the sub screen are simultaneously displayed on the display. Due to this, the size of each screen is reduced. United States Patent Application Publication No. US2012/0231884 discloses a technology which displays the sub screen half translucently to overlap with the basic screen. In this case, display area is secured, whereas simultaneous operation of the basic screen and the sub screen is not allowed.

SUMMARY OF THE INVENTION

According to an aspect of the present disclosure, an information processing apparatus of the present disclosure has a display, and comprising: a display control unit configured to display a first window and a second window on the display with the second window positioned behind the first window and at least partially overlapped with the first window; a first obtaining unit configured to obtain a first position information representing a position within a display range of the display designated on the display; a second obtaining unit configured to obtain a second position information corresponding to position information representing a position within the display range of the display, the second position information designated in an area corresponding to a rear side of the display and existing on one surface among the surfaces constituting the information processing apparatus; a receiving unit configured to receive an operation to copy an item included in the first window to the second window based on the first position information obtained by the first obtaining unit and to receive an operation to copy an item included in the second window to the first window based on the second position information obtained by the second obtaining unit.

Further features of the present invention will become apparent from the following description of exemplary embodiments (with reference to the attached drawings).

DESCRIPTION OF THE EMBODIMENTS

A preferred embodiment of the present disclosure is described in detail with reference to the drawings. Note that, the configuration described in the following descriptions is only an example and the scope of the present invention is not limited to the configuration described in the exemplary embodiment(s).

First Embodiment

Information Processing Apparatus

Figure 1A:
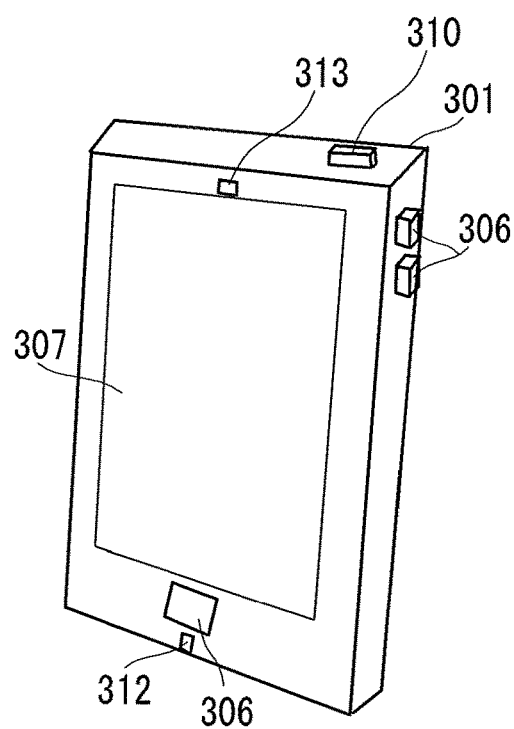
FIG. 1A is an external view of an information processing apparatus from front.
Figure 1B:
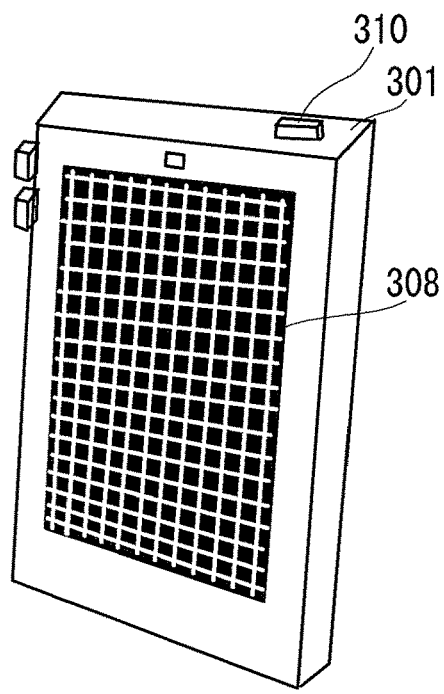
FIG. 1B is an external view of the information processing apparatus from back.

FIG. 1A is an external view of an information processing apparatus 301 viewed from a display side (front surface). FIG. 1B is an external view of the information processing apparatus 301 viewed from opposite side of a surface on which the display is provided (rear surface).

A front touch panel 307, comprised of a display and a touch pad, is provided on a front surface of the information processing apparatus 301. A speaker 313 is provided at an upper side of the front touch panel 307. A physical button 306 and a microphone 312 are provided at a lower side of the front touch panel 307. The physical button 306 is also provided at a right side of the information processing apparatus 301 viewed from front. An antenna 310 is provided at an upper side of the information processing apparatus 301 viewed from front.

The touch pad of the front touch panel 307 is, for example, an electrostatic capacitance type touch pad, which is a touch sensing panel for detecting a position on the display (touch position) designated by a user's touch. The display of the front touch panel 307 is, for example, a liquid crystal display. The front touch panel 307 is configured such that the touch pad is overlapped on the display. The physical button 306 provided at the lower side of the front touch panel 307 is, for example, an operation button such as home button. The physical button 306 provided at the right side of the information processing apparatus 301 viewed from front is, for example, a power button or a volume button. The antenna 310 is the antenna for radio communication suitable for mobile phone network (such as W-CDMA system, GSM™) and wireless LAN (such as IEEE802.11 system).

A rear touch pad 308 is provided on the rear surface (back side) on which the front touch panel 307 of the information processing apparatus 301 is provided. Similar to the touch pad used for the front touch panel 307, the rear touch pad 308 is, for example, an electrostatic capacitance touch pad, which is a touch sensing panel for detecting a touch position. The rear touch pad 308 has a size equal to or a bit larger than the front touch panel 307. The rear touch pad 308 is implemented in parallel to the front touch panel 307. The rear touch pad 308 and the front touch panel 307 have coordinates corresponding to each other. An operable range of touch operation of the front touch panel 307 matches with that of the rear touch pad 308. Each of the front touch panel 307 and the rear touch pad 308 is an operation unit for receiving touch operation by the user. The front touch panel 307 and the rear touch pad 308 are independently provided. Therefore, the user is allowed to operate the front touch panel 307 and the rear touch pad 308 at the same time.

It is noted that a variety of methods are available for detecting touch operation to the front touch panel 307 and to the rear touch pad 308, examples of which are resistive, capacitive, infrared, ultrasonic sound wave, acoustic wave, and vibration. Further, position information which corresponds to the touch position may be obtained using a system such as a range image sensor or a stereo camera which is capable of detecting a position in three-dimension (3D) space and is capable of detecting whether or not a touch is made to a surface to be input. Further, in a case where the detection is performed by detecting means capable of detecting the position information of a user's finger not touching the surface of the information processing apparatus 301 but close thereto (close position, hover position), for example, such information can equally be treated the same as the touch position.

Hardware Configuration

Figure 2:
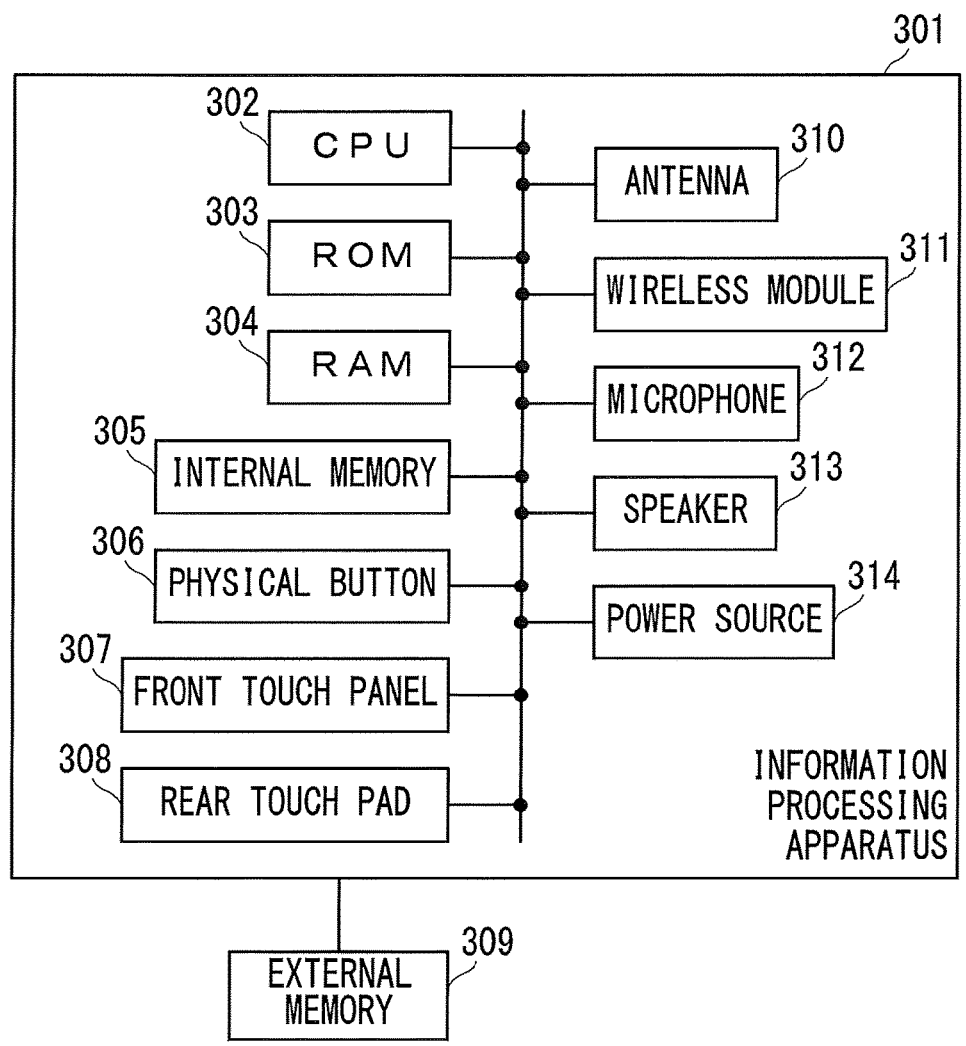
FIG. 2 is a hardware configuration diagram of the information processing apparatus.

FIG. 2 is a hardware configuration diagram of an information processing apparatus 301. The information processing apparatus 301 comprises the front touch panel 307, the rear touch pad 308, the physical button 306, the antenna 310, and the speaker 313 as illustrated in FIG. 1. In addition, the information processing apparatus 301 comprises a central processing unit (CPU) 302 for executing various processing for controlling operation of the information processing apparatus 301. A read only memory (ROM) 303 stores a predetermined computer program for controlling the operation of the information processing apparatus 301. A random access memory (RAM) 304 is a memory in which data is temporarily written and is a memory used as a work area when CPU executes program.

An internal memory 305 and an external memory 309 are large capacity storage medium for storing application program, image data, content and the like. A wireless module 311 is a device for realizing wireless function suitable for communication through mobile phone network and wireless LAN and including RF chip and MAC processing chip for performing processing of layer-2 and less in an OSI reference model. A power source 314 comprises a battery and a charging unit, through which, power can be supplied and charged to the information processing apparatus 301.

Function Block

Figure 3:
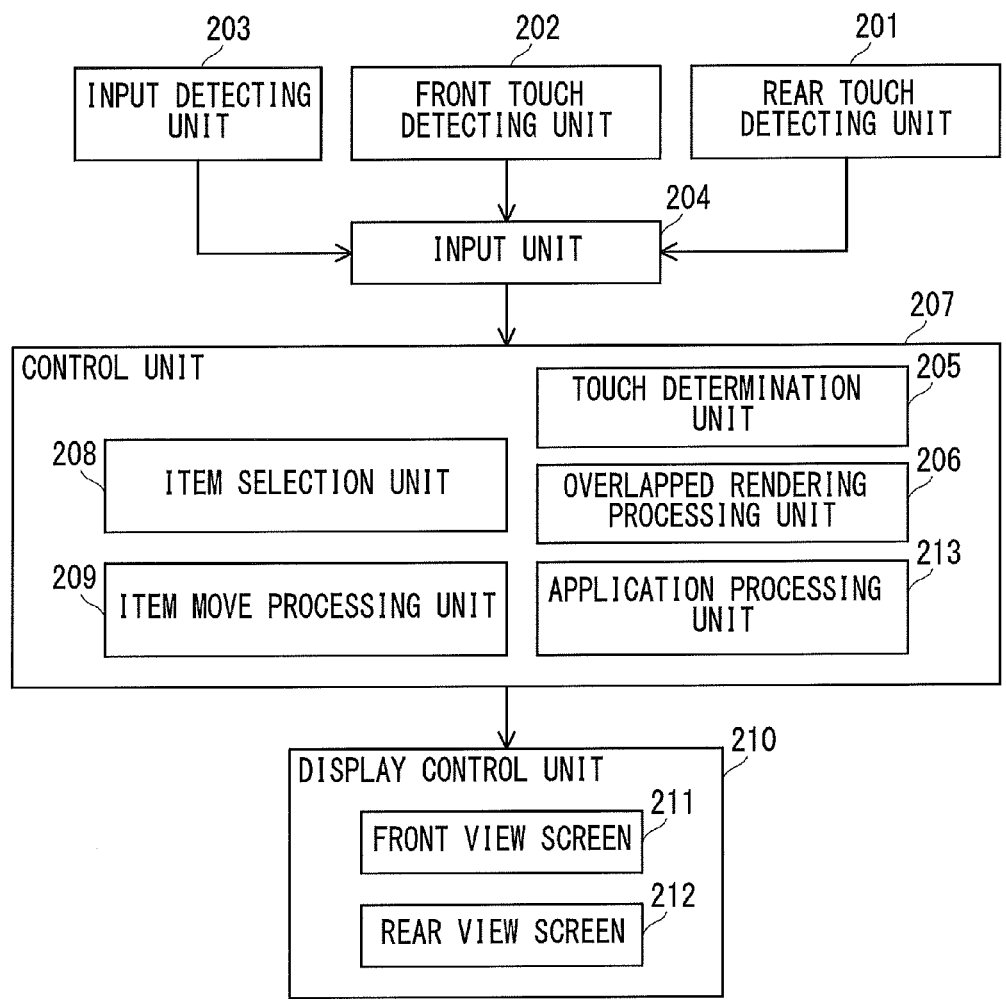
FIG. 3 is a functional block diagram of the information processing apparatus.

FIG. 3 is a function block diagram of the information processing apparatus 301. Each function is realized by loading and running a predetermined computer program from the ROM 303 by the CPU 302. The predetermined computer program corresponds to a series of processing, which will be explained later using a flowchart. On the information processing apparatus 301, a rear touch detection unit 201, a front touch detection unit 202, an input detection unit 203, an input unit 204, a control unit 207, and a display control unit 210 are provided. It is noted that, in the embodiment, each function is realized by software using the CPU 302, however, each function may be realized by hardware.

The rear touch detection unit 201 sends touch information concerning user's touch position and the like to the rear touch pad 308, to the input unit 204. The front touch detection unit 202 sends touch information concerning user's touch position and the like to the front touch panel 307, to the input unit 204. The input detection unit 203 sends signal by an operation of the physical button 306 to the input unit 204. The input unit 204 sends touch information received from the rear touch detection unit 201 and the front touch detection unit 202, and signal received from the input detection unit 203 to the control unit 207.

The control unit 207 comprises a touch determination unit 205, an overlapped rendering processing unit 206, an item selection unit 208, an item move processing unit 209, and an application processing unit 213. The control unit 207 performs processing in accordance with the touch information and the signal sent from the input unit 204.

The touch determination unit 205 identifies the user's touch position based on the touch information sent from the input unit 204. Then, the touch determination unit 205 notifies the item selection unit 208 and the item move processing unit 209 of the identified touch position. The touch information includes information on which of the front touch panel 307 and the rear touch pad 308 is touched. Due to this, the touch determination unit 205 can identify the touch position of the front touch panel 307 or the touch position of the rear touch pad 308 based on the touch information. The touch determination unit 205 is also capable of determining whether the user is performing the touch operation. For example, in a case where the touch information is unobtainable, the touch determination unit 205 determines that the touch operation is not performed (the user's finger is touching neither the front touch panel 307 nor the rear touch pad 308).

The item selection unit 208 selects corresponding item in accordance with the touch position notified from the touch determination unit 205. The item is displayed on a front window 211 and a rear window 212, as described later. The item selection unit 208 selects the item displayed near the touch position.

The item move processing unit 209 moves the item between the front window 211 and the rear window 212 in accordance with the touch position notified from the touch determination unit 205.

The overlapped rendering processing unit 206 causes the display control unit 210 to render the front window 211 over the rear window 212. The overlapped rendering processing unit 206 performs emphasis effect to spatially recognize the item move.

The application processing unit 213 runs various applications of the information processing apparatus 301 including a calculator application, mapping application, and an album application. In the present embodiment, items such as calculation result, map symbol, photographs and the like included in each application are handled as a target for operation (copy and paste). The application processing unit 213 runs application in accordance with the touch information or the signal sent from the input unit 204 and notifies the rendering information to the display control unit 210.

The display control unit 210 displays a first window of the front window 211 and a second window of the rear window 212 on the display of the front touch panel 307 at the same time. The front window 211 and the rear window 212 are the same size and they have coordinates corresponding to each other. Therefore, when the front window 211 is designated, the touch position to the rear window 212 is instructed in accordance with the touch position to the front window 211. The control unit 210 uses a RAM 304 as a rendering buffer and can render the front window 211 to overlap the rear window 212. The display control unit 210 displays the rendering result buffered in the RAM 304 on the display of the touch panel 307.

The front window 211 and the rear window 211 include changeable properties such as rendering size, rendering range, rendering position, rendering image, and display attribute, and rendering information of application. Rendering state of the front window 211 and the rear window 212 can be changed by changing the property. When touch information by a pinch operation or a tap operation to the front touch panel 307 or the rear touch pad 308 is sent from the input unit 204, properties of the front window 211 and the rear window 212, including the rendering size and the rendering position, are changed in accordance with the touch information.

The front window 211 is a screen for the application executed by the application processing unit 213. The operation to the front window 211 is performed in accordance with touch information (a first position information) from the front touch detection unit 202. It means that the operation to the front window 211 is performed through the touch operation to the front touch panel 307. When the front window 211 is transparently displayed, the rear window 212 becomes viewable. The rear window 212 is displayed behind the front window 211. The rear window 212 is used for displaying content of a clipboard and operated in accordance with touch information (a second position information) from the rear touch detection unit 201. It means that the operation to the rear window 212 is performed through the touch operation to the rear touch pad 308.

Copy and Paste Processing

Following description shows a processing procedure when the item is copied and pasted by the information processing apparatus 301 as mentioned above.

(1) Copy Processing

Figure 4:
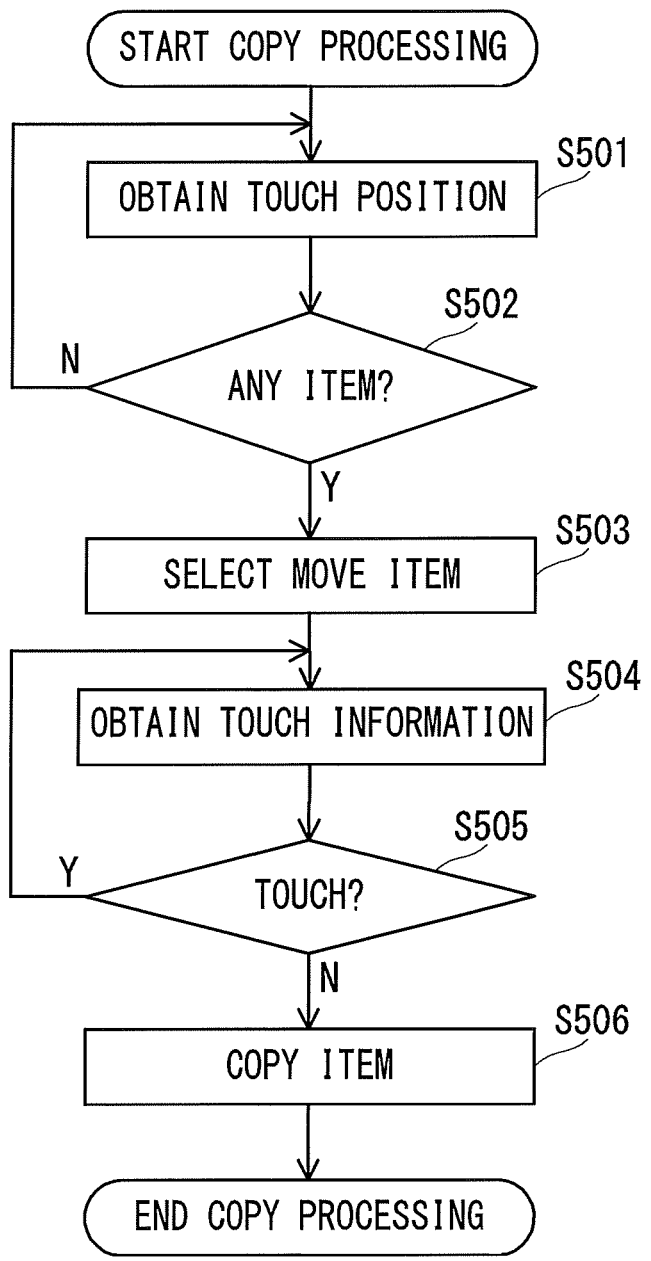
FIG. 4 is a flowchart illustrating a processing procedure of copy processing.

FIG. 4 is a flowchart illustrating a processing procedure of copy processing performed by the information processing apparatus 301. In FIG. 4, the item displayed on the front window 211 is copied to the rear window 212. It means that the item is copied to a clipboard from a runtime screen of the application.

The touch determination unit 205 of the control unit 207 obtains touch position based on the touch information sent from the input unit 204 (S501). The touch information, representing the touch position on the front window 211, is input to the control unit 207 by the front touch panel 307 via the front touch detection unit 202 and the input unit 204.

The item selection unit 208 determines presence and absence of the item at the touch position identified by the touch determination unit 205 (S502). The item selection unit 208 determines presence and absence of the item based on the touch position and the position at which the item is displayed. If it is determined that there is not any item (S502: N), the control unit 207 obtains next touch information (S501). If there is an item (S502: Y), the item selection unit 208 selects the item as the item to be moved (move item) (S503). The selected move item is highlighted on the display of the front touch panel 307 by changing color, performing moving image effect and the like.

When the move item is selected, the control unit 207 obtains the touch information of the front touch panel 307 (S504). The touch determination unit 205 determines whether the touch to the front touch panel 307 is continuously performed or not based on the touch information as obtained (S505). If it is determined that the touch is continuously performed (S505: Y), the control unit 207 continuously obtains the touch information (S504). If it is determined that the touch is not continuously performed (S505: N), the item move processing unit 209 copies the move item from the front window 211 to the rear window 212 (S506). It means that when the user finishes the touch operation to the front touch panel 307, the move item is copied to the clipboard.

When copying the move item, emphasis effect is performed by the overlapped rendering processing unit 206 such that copying of the move item from a front display space of the front window 211 to a rear display space of the rear window 212 is realized. One emphasis effect includes animation effect, in which the move item is peeled off backward from the front window 211 to get close to the rear window 212. Other emphasis effect includes animation effect, in which a ripple is spread around the move item landing on the rear window 212.

The item is copied from the front window 211 to the rear window 212 as mentioned above.

(2) Paste Processing

Figure 5:
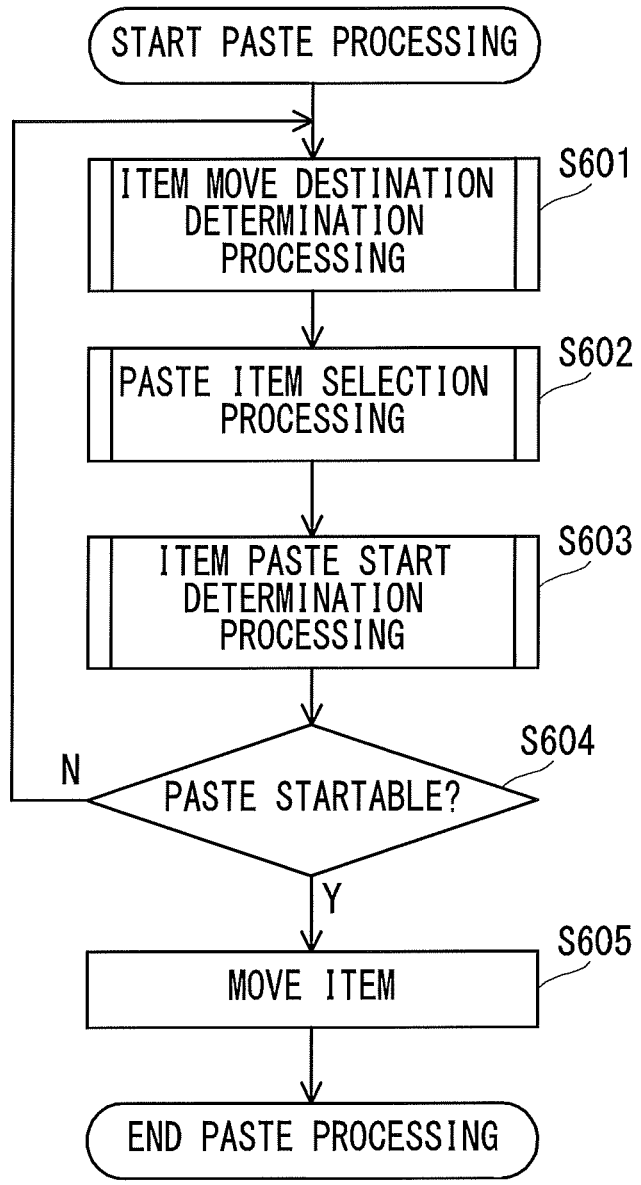
FIG. 5 is a flowchart illustrating a processing procedure of paste processing.

FIG. 5 is a flowchart illustrating a processing procedure of paste processing performed by the information processing apparatus 301. In FIG. 5, the item on the rear window 212 (clipboard) is pasted to the front window 211. The paste processing is started by the user's touch operation to the rear touch pad 308.

Through an item move destination determination processing, which will be described later, the control unit 207 identifies where to paste the item (target item) to be pasted to the front window 211 (S601). The item move destination determination processing is followed by a target item selection processing, which will be described later. Through the target item selection processing, the control unit 207 identifies the target item to be pasted from the rear window 212 to the front window 211 (S602). The target item selection processing is followed by an item paste start determination processing, which will be described later. Through the item paste start determination processing, the control unit 207 determines whether or not start of pasting the target item is allowed (S603). If it is determined that start of pasting the target item is not allowed (S604: N), the control unit 207 again performs the item move destination determination processing (S601). If it is determined that start of pasting the target item is allowed (S604: Y), the control unit 207 moves the target item from the rear window 212 to the paste position on the front window 211 by the item move processing unit 209 (S605). When moving the target item, emphasis effect is performed by the overlapped rendering processing unit 206 such that move of the target item from the display space of the rear window 212 to the display space of the front window 211 is realized.

The item is pasted from the rear window 212 to the front window 211 as mentioned above. The item move destination determination processing, the target item selection processing and the item paste start determination processing will be described.

(3) Item Move Destination Determination Processing

Figure 6:
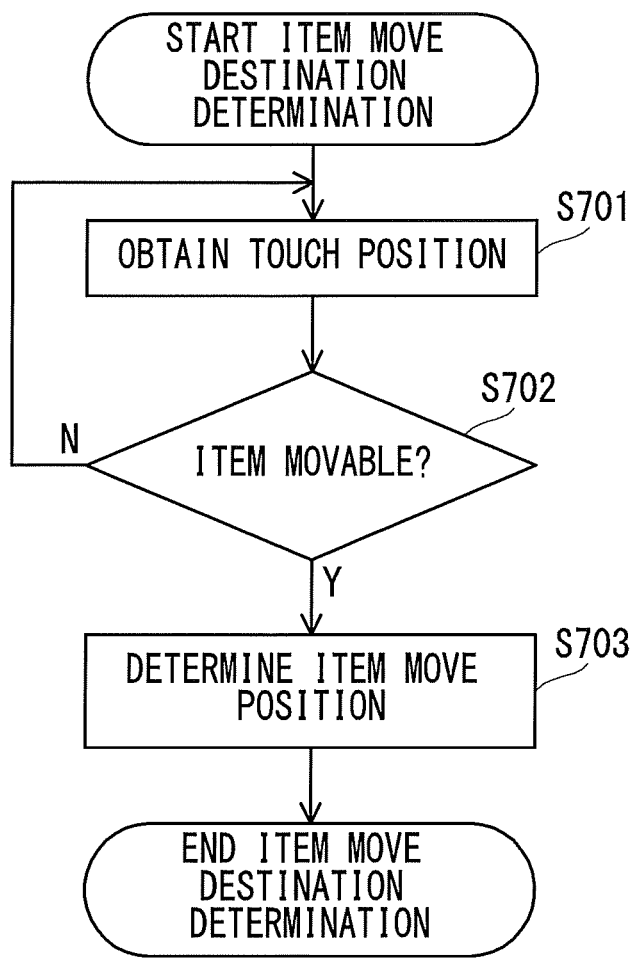
FIG. 6 is a flowchart illustrating a processing procedure of item move destination determination processing.

FIG. 6 is a flowchart illustrating processing procedure of the item move destination determination processing performed by the information processing apparatus 301.

The touch determination unit 205 of the control unit 207 obtains touch position based on the touch information sent from the input unit 204 (S701). The touch information, representing the touch position on the front window 211, is input to the control unit 207 by the front touch panel 307 via the front touch detection unit 202 and the input unit 204.

The item move processing unit 209 determines whether the touch position obtained by the touch determination unit 205 is the item-movable position or not (S702). It means that the item move processing unit 209 determines whether the touch position is on the front window 211 and it is paste-allowable position or not. If it is determined that the position is not the item-movable position (S702: N), the control unit 207 obtains the touch position by the touch determination unit 205 based on the touch information as again obtained (S701).

If it is determined that the position is the item-movable position (S702: Y), the control unit 207 determines the position as the item move position. This turns the position into an item move position determined state (S703). The position will be the item move position (paste position). It is noted that if the touch to the front touch detection unit 202 is released or the touch position is moved after the position is turned into the item move position determined state, the item move position determined state is released.

(4) Target Item Selection Processing

Figure 7:
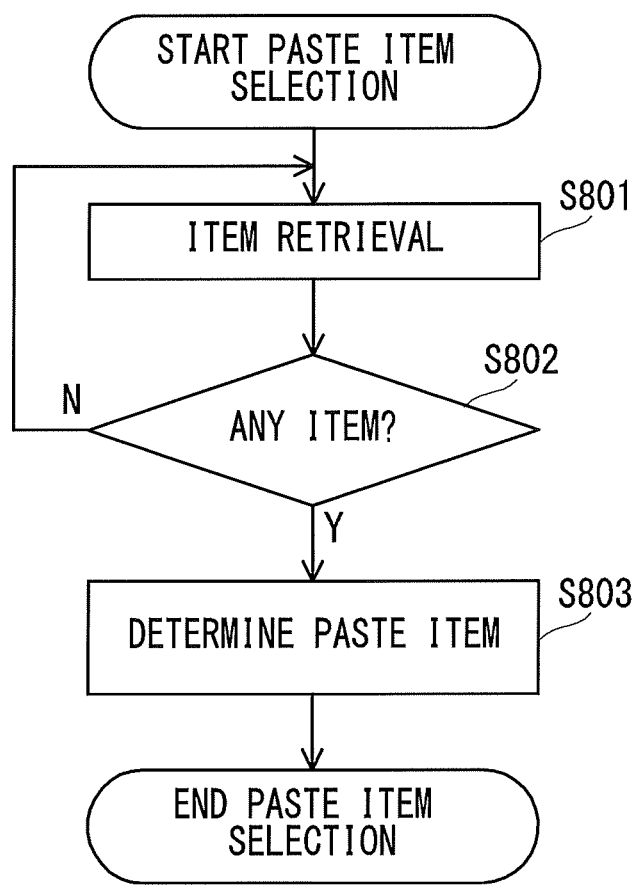
FIG. 7 is a flowchart illustrating a processing procedure of paste target selection processing.

FIG. 7 is a flowchart illustrating a processing procedure of target item selection processing performed by the information processing apparatus 301.

When selecting the target item, content of the clipboard is displayed on the rear window 212. From the start of paste processing to the start of selecting the target item of FIG. 5, the rear window 212 is moved, by the user, near the item-movable position as determined by the item move destination determination processing. The user moves the rear window 212 by performing the touch operation to the rear touch pad 308. The front window 211 is transparently displayed. The rear window 212 is displayed behind and partially overlapped with the front window 211.

The item selection unit 208 of the control unit 207 retrieves the item on the rear window 212 near the item move position determined by the item move destination determination processing, the rear window 212 overlapped on the front window 211 (S801). If any item is retrieved near the item move position (S802: Y), the item selection unit 208 determines the item as the target item. This turns the item into a target item determined state. It is noted that if the rear window 212 moves by the operation of the touch pad 308 after the item is determined as the target item, the control unit 207 releases the target item determined state.

If any item is not retrieved near the item move position (S802: N), the item selection unit 208 again performs the item retrieval (S801). At this time, the user will move the rear window 212 by operating the rear touch pad 308 to retrieve any desired item.

(5) Item Paste Start Determination Processing

Figure 8:
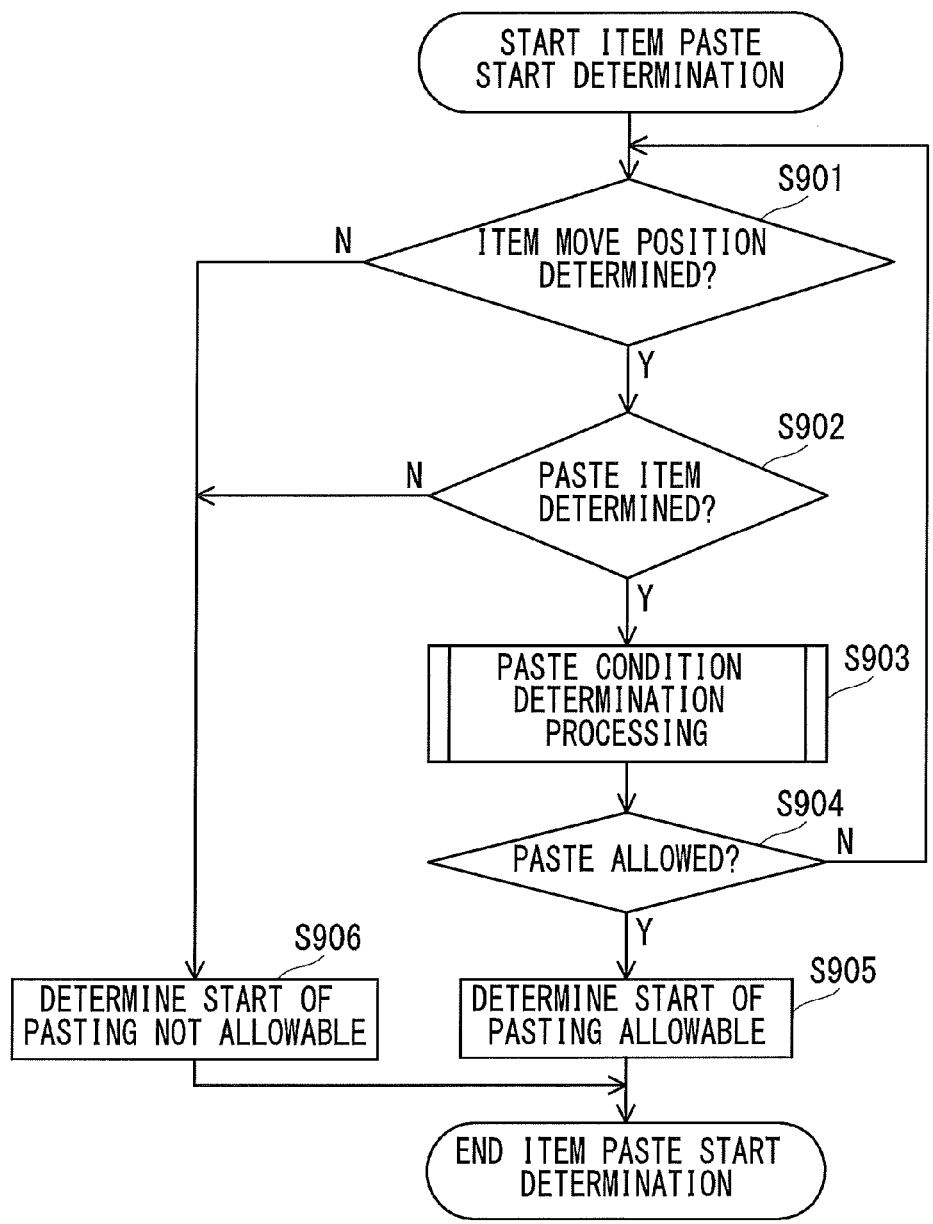
FIG. 8 is a flowchart illustrating a processing procedure of item paste start determination processing.

FIG. 8 is a flowchart illustrating a processing procedure of the item paste start determination processing performed by the information processing apparatus 301.

The control unit 207 determines whether the item move position determined state and the target item determined state are released (S901, S902). If it is determined that the item move position determined state is released (S901: N), or the target item determined state is released (S901: Y, S902: N), the control unit 207 determines that start of pasting the item is not allowed (S906).

If it is determined that neither the item move position determined state nor the target item determined state is released (S901: Y, S902: Y), the control unit 207 performs a paste condition determination processing, which will be described later (S903). The paste condition determination processing determines whether pasting the target item to the front window 211 is allowed or not. If it is determined that pasting is not allowed (S904: N), the control unit 207 repeats the processing from S901 to S903 until pasting is allowed. If it is determined that pasting is allowed (S904: Y), the control unit 207 turns into a paste start permission determination state (S905).

(6) Paste Condition Determination Processing

Figure 9:
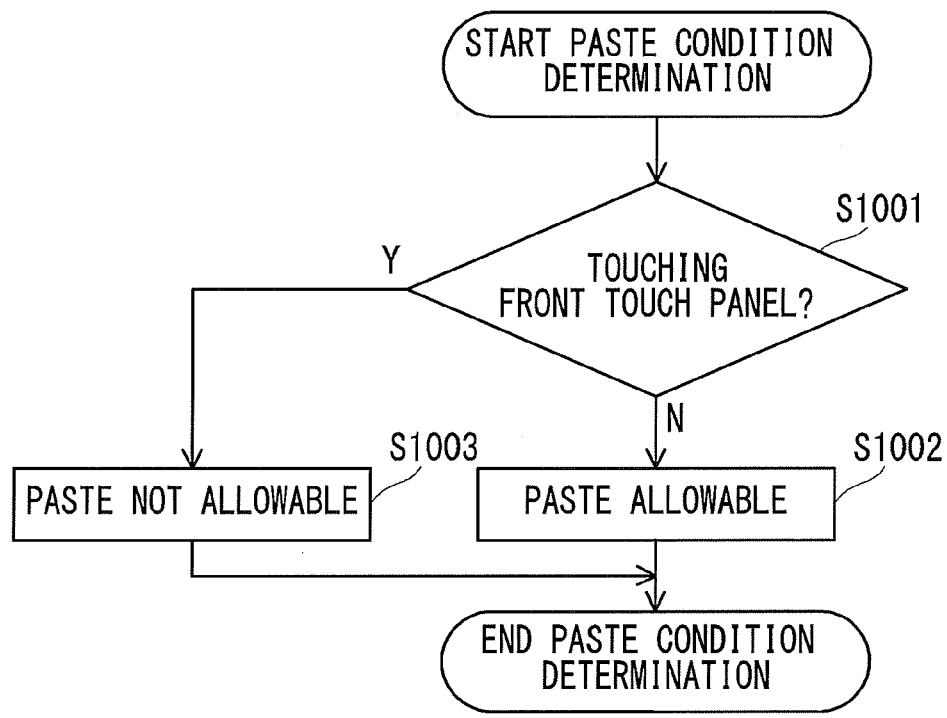
FIG. 9 is a flowchart illustrating a processing procedure of paste condition determination processing.
Figure 10:
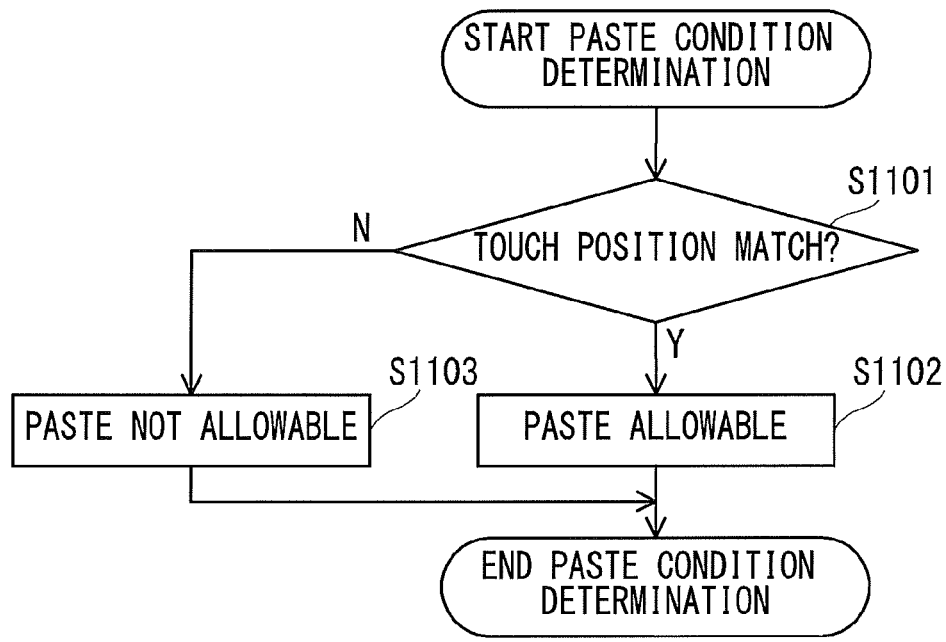
FIG. 10 is a flowchart illustrating a processing procedure of paste condition determination processing.

FIGS. 9 and 10 are flowcharts respectively illustrating a processing procedure of a paste condition determination processing performed by the information processing apparatus 301. The determination conditions are different between the processing in FIG. 9 and that in FIG. 10. One of the processing as illustrated in FIG. 9 and FIG. 10 is performed at S903 in FIG. 8.

In FIG. 9, paste condition is determined based on the touch state to the front touch panel 307.

The touch determination unit 205 of the control unit 207 determines whether the user is touching the front touch panel 307 (S1001). If it is determined that the user is not touching the front touch panel 307 (S1001: N), the control unit 207 determines that it is in paste-allowable state (S1002). If it is determined that the user is touching the front touch panel 307 (S1001: Y), the control unit 207 determines that it is in paste-non allowable state (S1003).

Based on the determination, if the user releases his finger from the touch panel 307, the target item can be moved from the rear window 212 to the front window 211. By releasing the finger, the target item moves from the rear window 212. This provides an impression that the item is spatially sucked up from behind. Therefore, an intuitive operation feeling by a spatial recognition can be obtained.

In FIG. 10, paste condition is determined based on the touch state to the front touch panel 307 and the rear touch pad 308.

The touch determination unit 205 of the control unit 207 determines whether the user is touching both the front touch panel 307 and the rear touch pad 308 and the touch position of the front touch panel 307 matches with the touch position of the rear touch pad or not (S1101). If it is determined that both touch positions match (S1101: Y), the control unit 207 determines that it is in paste-allowable state (S1102). If it is determined that both touch positions do not match or at least either one of the front touch panel 307 and the rear touch pad 308 is not touched (S1101: N), the control unit 207 determines that it is in paste-non allowable state (S1103).

Pasting is started when the touch position of the front touch panel 307 matches with that of the rear touch pad 308, which makes the user easily recognize completion of the operation. Through this, an intuitive operation feeling is realized.

Operation Form

Figure 11A:
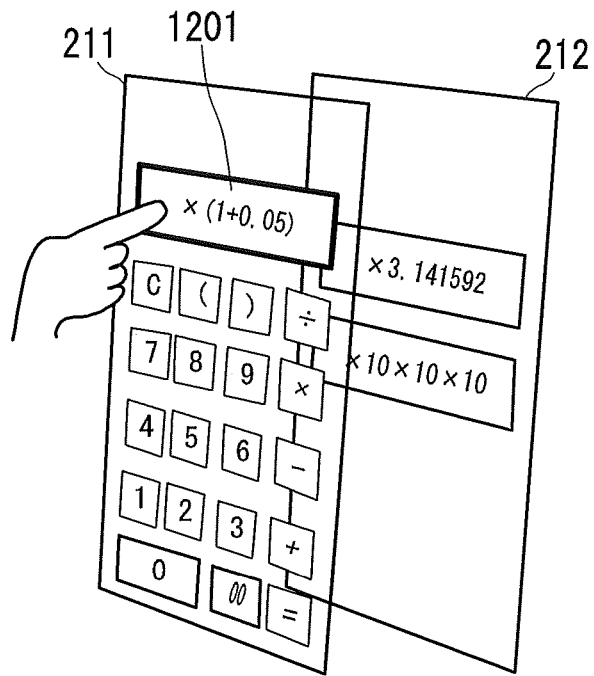
FIGS. 11A and 11B are explanatory diagrams of front window and rear window.
Figure 11B:
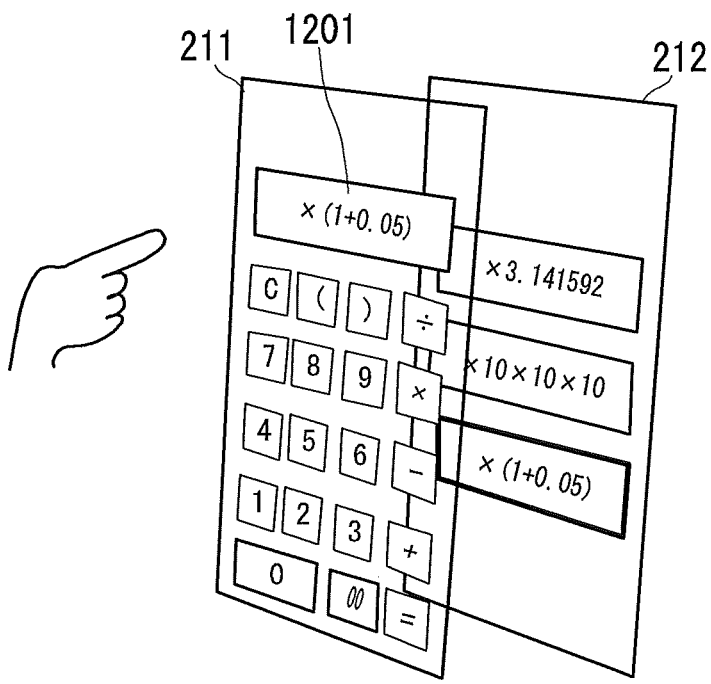

FIGS. 11A and 11B are explanatory diagrams of the front window 211 and the rear window 212 when the copy processing shown in FIG. 4 is executed by a calculator application.

FIG. 11A shows a state where the user is touching a display frame (box) 1201 of the calculator application displayed on the front window 211. A calculation formula displayed in the display frame 1201, which is an item of the touch position, is selected as the move item and is highlighted (S503 in FIG. 4). FIG. 11B shows a state where touch to the display frame 1201 is released (S505 in FIG. 4). By releasing the touch to the display frame 1201, the calculation formula displayed in the display frame 1201 is copied to an end of the clipboard of the rear window 212 (S506 in FIG. 4).

FIGS. 12A to 12D are explanatory diagrams of the front window 211 and the rear window 212 when the paste processing shown in FIG. 5 is executed by the calculator application.

Figure 12A:
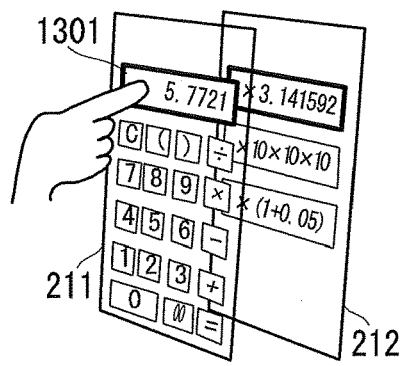
FIGS. 12A to 12D are explanatory diagrams of front window and rear window.

FIG. 12A shows a state where the user is touching a paste destination of a display frame 1301 of the calculator application. The display frame 1301 is the item-movable position and is highlighted (S702 in FIG. 6). This determines the paste position from the rear window 212 (S703 in FIG. 6, S601 in FIG. 5). In FIG. 12A, an item on the rear window 212 which is at the same coordinates of the paste position on the front window 211 is highlighted as a target item candidate (S802 in FIG. 7).

Figure 12B:
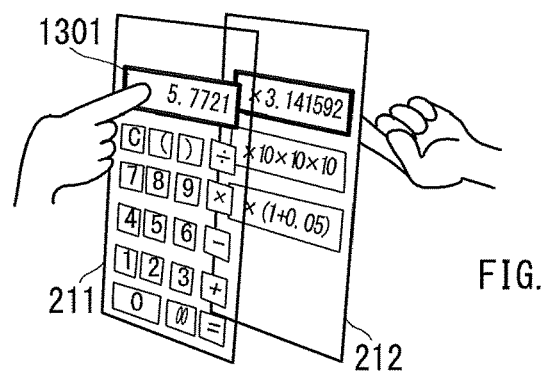
Figure 12C:
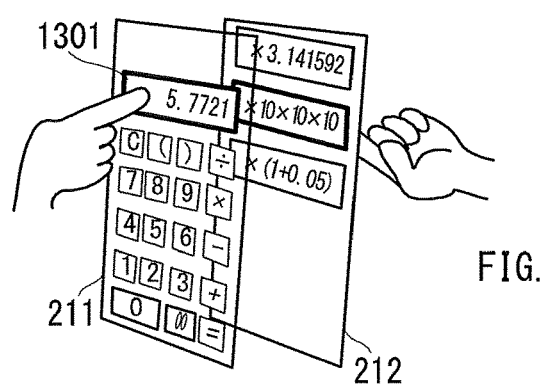

If there is not any selectable item at the coordinate position of the rear window 212 which is the same as the paste position on the front window 211 (S802: N in FIG. 7), highlighting, representing that item is selected, is not performed. In this case, the rear window 212 is scrolled by the user until any selectable item appears. The user scrolls the rear window 212 by a touch operation to the rear touch pad 308. FIG. 12B shows a state where the user scrolls the rear window 212. FIG. 12C shows a state in which another selectable item is highlighted due to the user's scroll of the rear window 212 (S803 in FIG. 7, S602 in FIG. 5).

Figure 12D:
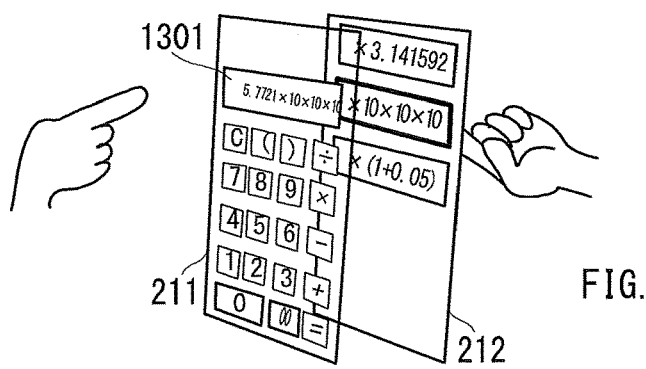

In FIG. 12C, the user is touching the front touch panel 307 and the rear touch pad 308. Since the respective touch positions match (S1101: Y, S1102: Y in FIG. 10), it is in paste-allowable state. FIG. 12D shows a state where pasting is performed by the user's release of the touch to the front touch panel 307 (S605 in FIG. 5). The touch to the front touch panel 307 is released (S1001 in FIG. 9) so that it is in a paste-allowable state.

By transparently displaying a copy source screen of the front window 211, the information processing apparatus 301 as mentioned above enables to browse the clipboard of the rear window 212. This enables to operate the rear window 212 while keeping the front window 211 in operable state without giving any influence to the screen size of the front window 211. Also, the information processing apparatus 301 realizes intuitive copy and paste utilizing a space through the operation of the front window 211 by the front touch panel 307 and through the operation of the rear window 212 by the rear touch pad 308. The description has been made in a case where two windows, the front window 211 and the rear window 212 are used, which, however, three or more windows may be used.

Second Embodiment

In the first embodiment, in terms of the paste processing order (see FIG. 5), the item move destination determination processing is first performed and then the target item selection processing is followed. In the second embodiment, reversing the order, the target item is first selected and then, the item move destination is determined. The information processing apparatus 301 having the same configuration of the first embodiment may also be adapted in the second embodiment. Therefore, the description concerning the configuration of the information processing apparatus 301 is omitted.

Figure 13:
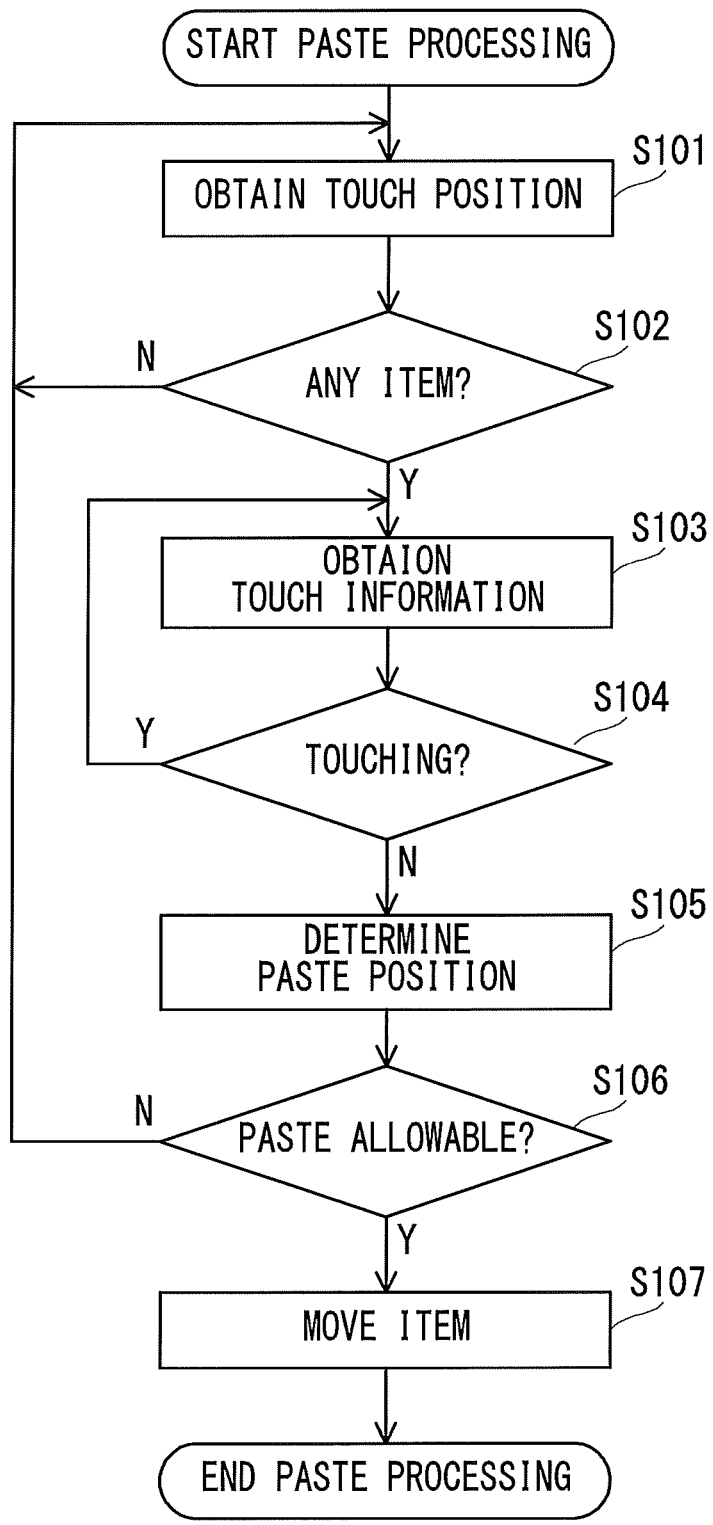
FIG. 13 is a flowchart illustrating a processing procedure of paste processing.

FIG. 13 is a flowchart illustrating a processing procedure of paste processing performed by the information processing apparatus 301. By touching the rear touch pad 308, the user selects the item from the rear window 212 and drags the item at an intended paste position.

The touch determination unit 205 of the control unit 207 obtains the touch position based on the touch information sent from the input unit 204 (S101). The touch information, representing the touch position on the rear window 212, is input to the control unit 207 from the rear touch pad 308 via the rear touch detection unit 201 and the input unit 204.

The item selection unit 208 determines whether or not there is any paste-allowable item on the touch position on the rear window 212 obtained by the touch determination unit 205 (S102). If it is determined that there is not any paste-allowable item (S102: N), the control unit 207 again obtains the touch position (S101).

If it is determined that there is a paste-allowable item (S102: Y), the touch determination unit 205 obtains the touch information (S103) and determines the touch state until the touch to the rear touch pad 308 is discontinued (S104). If the touch to the rear touch pad 308 is discontinued (S104: N), the control unit 207 determines a paste position on the front window 211 (S105). The paste position on the front window 211 determined by the control unit 207 is at the same coordinates as that of the rear window 211 corresponding to the touch position of the rear touch pad 308 last obtained by the touch determination unit 205.

The item move processing unit 209 determines whether the paste position on the front window 211 is a paste-allowable position (S106). If it is determined that the position is a paste-non allowable position (S106: N), the control unit 207 repeats the processing from S101. If it is determined that the position is a paste-allowable position (S106: N), the item move processing unit 209 moves the target item to the paste position (S107).

As mentioned above, in the second embodiment, an item is pasted by selecting the item on the rear window 212 (clipboard) with the rear touch pad 308, and dragging and releasing the item to the desired position.

Figure 14A:
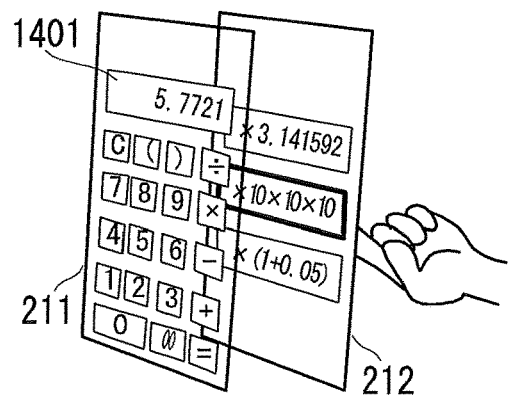
FIGS. 14A to 14C are explanatory diagrams of front window and rear window.
Figure 14B:
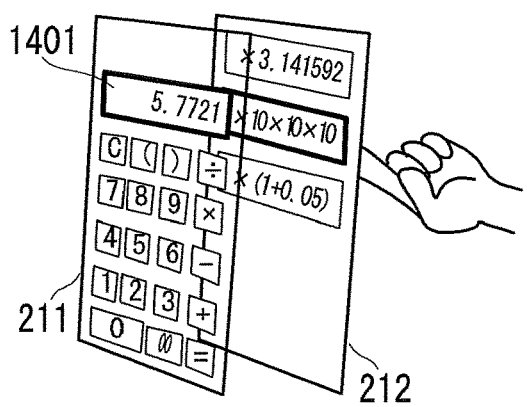
Figure 14C:
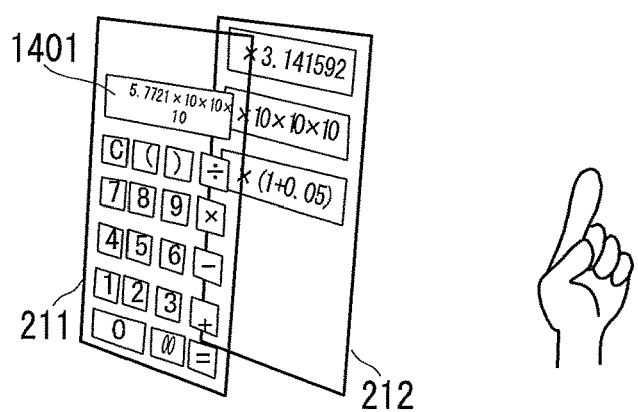

FIGS. 14A to 14C are explanatory diagrams of the front window 211 and the rear window 212 when the paste processing shown in FIG. 13 is executed by the calculator application.

The FIG. 14A shows a state where the user designates the target item of a calculation formula by the touch operation to the rear touch pad 308. The target item to be moved is highlighted because there is a movable item at the touch position (S102: Y in FIG. 13). At this time, since there is not any item-movable position on the front window 211 where corresponds to the touch position of the rear window 212 in FIG. 14A, the paste position is not determined and the front window 211 is not highlighted (S105 in FIG. 13).

FIG. 14B shows a state where the user scrolls the rear window 212 to the position where allows the target item to move. By scrolling the rear window 212, the target item is allowed to move so that the move destination (paste position) is highlighted (S105 in FIG. 13). FIG. 14C shows a state where the touch to the rear window 212 is released. By releasing the touch, the target item is moved (S107 in FIG. 13). In this case, the calculation formula moves to the display frame 1401 of the front window 211.

In each embodiment, the copy and paste operation has been described as the move of the item. In the embodiment as described above, the move of the item can be replaced with copy of the item. Also, the calculator application is illustrated to explain copying and pasting. The application, however, may be any application as long as it handles item such as Web browser, mailer, album and the like. Also, the copy source application and paste destination application may be different. For example, when an item of an album application is copied, the copied item may be available for a mailer application in attaching the item to an e-mail.

According to the above, the operation to the item within the front window 211 displayed on the display is received through the designation to the display. Also, the operation to the item within the rear window 212 displayed on the display is received through the designation to the backside of the display. Such configuration is applicable to processing other than copying and pasting. For example, in an image edit application, a plurality of layers comprising of one image is respectively displayed on the front window 211 and the rear window 212. Then, an operation of drawing a line drawing within the front window 211 through the operation to the front touch panel 307 may be received. Also, an operation of coloring the line drawing through the operation to the rear touch pad 308 may be received. Also, it may be configured such that any application screen is displayed as the front window 211 while displaying any auxiliary application screen such as a calendar application, memo pad and the like as the rear window 211 to allow operation from both the front touch panel 307 and the rear touch pad 308.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

This application claims the benefit of Japanese Patent Application No. 2013-253173, filed Dec. 6, 2013, which is hereby incorporated by reference herein in its entirety.

What is claimed is:

1. An information processing apparatus having a display and further comprising:
    one or more processors; and
    a memory storing instructions, which, when executed by the one or more processors, causes the information processing apparatus to:
    display a first window and a second window on the display with the second window positioned behind the first window and at least partially overlapped with the first window;
    obtain first information representing a position within a display range of the display, the first information being input via touching on the display;
    obtain second information corresponding to position information representing a position within the display range of the display, the second information being input via touching on a surface corresponding to a rear side of the display, the rear side of the display existing on one surface among the surfaces constituting the information processing apparatus;
    receive a first operation for selecting an item among at least one item included in the first window based on the first information and copying the selected item to the second window;
    display, each time the first operation is received, the item copied according to the first operation on a predetermined position in the second window in line;
    receive a second operation to select, based on the second information, an item among at least one item positioned on the second window as a result of the first operation and move the selected item in the second window;
    in response to receiving a third operation for copying the item selected by the second operation to the first window, display, at a first position within the first window which corresponds to a second position, the item copied according to the third operation, the second position corresponding to a position within the second window to which the item is moved by the second operation;
    the second operation includes an instruction to scroll the content of the second window, and the selected item is moved within the second window in accordance with the scroll of the second window; and
    wherein the third operation is input via releasing the touch corresponding to the second operation to the surface corresponding to the rear side of the display.

2. The information processing apparatus according to claim 1, wherein the execution of the instructions by the one or more processors further causes the information processing apparatus to, in a case where the position within the first window designated based on the first information matches with the first position within the first window, receive releasing of the touch to the display for designating the position as the third operation.

3. The information processing apparatus according to claim 1, wherein the first window and the second window are the same size and have coordinate positions corresponding to each other.

4. The information processing apparatus according to claim 1, wherein the first window is displayed transparently.

5. The information processing apparatus according to claim 1, wherein the execution of the instructions by the one or more processors causes the information processing apparatus to display an application screen as the first window and displays content of clipboard as the second window.

6. The information processing apparatus according to claim 1, further comprising a touch sensing panel provided on a surface which includes the display and constitutes one surface of the information processing apparatus, and the touch sensing panel overlaps the display, and
   a touch sensing panel, the sensing panel provided on a rear side of the display, the rear side of the display existing on one surface among the surfaces constituting the information processing apparatus.

7. The information processing apparatus according to claim 1, wherein the item copied is displayed without replacement.

8. A method executed by an information processing apparatus having a display, comprising: displaying a first window and a second window on the display with the second window positioned behind the first window and at least partially overlapped with the first window;
   obtaining first information representing a position within a display range of the display, the first information being input via touching on the display;
   obtaining second information corresponding to position information representing a position within the display range of the display, the second information being input via touching on a surface corresponding to a rear side of the display, the rear side of the display existing on one surface among the surfaces constituting the information processing apparatus;
   receiving a first operation for selecting an item among at least one item included in the first window based on the first information and copying the selected item to the second window;
   displaying, each time the first operation is received, the item copied according to the first operation on a predetermined position in the second window side by side;
   receiving a second operation to select, based on the second information, an item among at least one item positioned on the second window as a result of the first operation and to move the selected item in the second window;
   in response to receiving a third operation for copying the item selected by the second operation to the first window, displaying, at a first position within the first window which corresponds to a second position, the item copied according to the third operation, the second position corresponding to a position within the second window to which the item is moved by the second operation;
   the second operation includes an instruction to scroll the content of the second window, and the selected item is moved within the second window in accordance with the scroll of the second window; and
   wherein the third operation is input via releasing the touch corresponding to the second operation to the surface corresponding to the rear side of the display.

* * * * *